(12) United States Patent  
Ito

(10) Patent No.: US 6,317,260 B1  
(45) Date of Patent: Nov. 13, 2001

(54) STEREOSCOPIC MICROSCOPE

(75) Inventor: Eiichi Ito, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,647

(22) Filed: Jun. 1, 2000

(30) Foreign Application Priority Data

May 31, 1999 (JP) .................................................. 11-150832

(51) Int. Cl.[7] .................................................. G02B 21/22
(52) U.S. Cl. .......................................... 359/377; 359/380
(58) Field of Search ..................................... 359/376, 377, 359/379, 380, 363, 368, 369

(56) References Cited

U.S. PATENT DOCUMENTS 3,804,486 * 4/1974 Van Exel et al. ..................... 359/368
4,364,629 * 12/1982 Lang et al. ........................... 359/377
5,689,365 * 11/1997 Takahashi ............................ 359/376
5,825,532   10/1998 Mochizuki et al. .

* cited by examiner

Primary Examiner—Jon Henry  
(74) Attorney, Agent, or Firm—Pitney, Hardin, Kipp & Szuch LLP

(57) ABSTRACT

A video-type stereoscopic microscope is composed of a close-up optical system which emits object light rays from an object as parallel rays, a pair of zoom optical systems which converges the object light rays having passed through different parts of the close-up optical systems and a relay optical system which relays images formed by the respective zoom optical systems to a CCD. Zoom lens barrels which hold the respective zoom optical systems individually are fixed in a zoom housing such that the position thereof can be adjusted in the axial direction. This zoom housing is fixed in a casing of the stereoscopic microscope such that the position thereof can be adjusted in the direction of the optical axis of the close-up optical system.

6 Claims, 13 Drawing Sheets

STEREOSCOPIC MICROSCOPE

BACKGROUND OF THE INVENTION

1. Field of the invention

The present invention relates to a stereoscopic microscope in which real images of an object are respectively formed by a pair of objective optical systems, which are separately placed with a predetermined base length therebetween, and in which the real images are relayed by another optical system.

2. Description of the Related Art

This type of video-type stereoscopic microscope is used when tiny tissues, such as a brain, are operated.

Since it is difficult to observe a structure of an organ consisting of tiny tissues, such as a brain, by direct viewing, the operations for such an organ must be proceeded under a microscope. Besides, since it is impossible to observe the three-dimensional structure of a tissue with a monocular microscope, a stereoscopic microscope has been used to enable three-dimensional magnifying observation of the tissue in order to perform accurate operations.

Such stereoscopic microscope is classified into an optical type one and a video type one. In either type of the stereoscopic microscope, an optical structure, in which a pair of objective optical systems separately placed with a predetermined base length therebetween to respectively form real images of same object, is adopted. In the optical-type stereoscopic microscope, a pair of real images (that is, a pair of primary images) once formed by the pair of objective optical systems are transferred through a pair of eyepieces as virtual images, and the virtual images are observed by an observer. On the other hand, in the video-type stereoscopic microscope, a pair of real images are relayed through a pair of relay optical systems to re-form the respective images on an image taking surface of an image pickup device.

In the stereoscopic microscopes with those constructions, the positions of the primary images of same object formed by the pair of objective optical systems may deviate from each other in the direction of the optical axes of the optical systems, because of manufacturing errors possible to occur in each objective optical system, or of installation errors possible to occur on the objective optical systems with respect to the housing. In such cases, adjusting the eyepiece optical system or relay optical systems for transmitting the primary images may be conducted to adjust the focal condition of the final images to be picked up or observed.

However, when the optical systems that are disposed after the primary images are adjusted, there could be a drawback that the magnification and the size of the final images may be different between the left and right optical systems. In order to eliminate the occurrence of the drawbacks, such as the difference of magnification and position of image, an operator has to conduct the adjustment of the entire optical system after adjusting eyepiece optical systems and/or the relay optical systems so that the focal conditions and the magnifications of the resultant images may be matched between the right and the left optical systems. That also causes a problem that the entire adjustment procedures become too complicated.

SUMMARY OF THE INVENTION

Accordingly, the present invention is devised in view of the above-mentioned problems. An object of the present invention is to provide a stereoscopic microscope in which a simple adjusting mechanism is provided for adjusting the positions of the real images of same object, which are formed by left and right objective optical system.

To achieve the above-mentioned object, the present invention provides a stereoscopic microscope which includes a close-up optical system that emits object light rays from an object as parallel rays and a pair of image-forming optical systems that converges the object light rays that have passed through different parts of the close-up optical system to form respective real images of the object. The stereoscopic microscope further includes a pair of image-forming lens barrels that holds the image-forming optical systems, respectively, a lens barrel housing that supports each of the image-forming lens barrels such that positions of the image-forming lens barrels are independently adjustable in a direction of optical axes of the image-forming optical systems, while keeping a condition that the optical axes are in parallel with each other, and a casing that holds the close-up optical system and the lens barrel housing such that a position of the lens barrel housing is adjustable in a direction of the optical axes of the image-forming optical systems, while keeping a condition that each of the optical axis is parallel with an optical axis of the close-up optical system.

With this construction, by moving each of the image-forming lens barrels with respect to the lens barrel housing, each of the image-forming optical system can be moved as a unit in the direction of the optical axis. Therefore, an operator can adjust the positions of the real images formed through the image-forming optical system without changing the spacing between the constituent lenses within the image-forming optical system. Also, at assembly, in advance of installing the lens barrel housing into a casing, the focal points of the respective image-forming optical systems held in the respective image-forming lens barrels which are supported by the lens barrel housing can be adjusted to coincide with each other. Thus, a remained positional adjustment should to be done inside the casing by the operator is to adjust the focal points of both of the image-forming optical systems which are made to be coincident with each other, by moving the lens barrel housing. Accordingly, the adjustment procedure becomes simpler.

When the image-forming lens barrel is moved in the direction of the optical axis, the distance between the close-up optical system and the image-forming optical system changes. However, the object light rays emitted from this close-up optical system is parallel rays. Therefore, this never leads to degradation of the image quality nor affects the focus adjustment of the close-up optical system.

The stereoscopic microscope of the present invention may be an optical-type stereoscopic microscope in which the real images of the object formed by the respective image-forming optical systems are magnified by a pair of eyepieces or may be a video-type stereoscopic microscope in which the real images of the object formed by the respective image-forming optical systems are relayed onto an image taking surface of an image pickup device through a pair of relay optical systems. In the latter case, in order to ensure that a pair of images respectively relayed by the relay optical systems do not overlap with each other, field stops having an edge for shielding a portion of images may be provided, and the positions of the images may be adjusted to the positions of these field stops.

Also, the image-forming optical system of the present invention may be a zoom optical system, or single-focus lens.

Moreover, the lens barrel housing of the present invention may have a pair of through holes into which the respective image-forming optical system lens barrels are inserted, and each of the image-forming lens barrels may be supported in the lens barrel housing by a pair of rings, which is engaged with external threads formed on an outer peripheral surface of the corresponding image-forming optical system lens barrel, and which sandwiches the lens barrel housing, so that a position of each of the image-forming optical systems is adjustable relative to the lens barrel housing. With such a construction, by changing the position of each ring with respect to each image-forming lens barrel, the position of each image-forming lens barrel can easily be changed relative to the lens barrel housing.

BRIEF DESCRIPTION OF DRAWINGS

The invention will be described below in detail with reference to the accompanying drawing, in which.

DESCRIPTION OF THE PREFERRED EMBODIMENT

The preferred embodiment of the present invention will now be described in detail below with reference to the accompanying drawings.

A video-type stereoscopic microscope (hereafter referred to as "stereoscopic microscope" for simplicity) according to the present embodiment is incorporated in a surgical operation supporting system that is used in cerebral surgical operations, for example. In this surgical operation supporting system, the three-dimensional image (stereovision image) of a tissue of a patient, which is taken by a stereoscopic microscope, is combined with CG (Computer Graphic) images, which is created from data about a diseased part in the tissue, in advance. The combined image is displayed on a stereoscopic viewer for a lead surgeon and on monitors for other staffs, and simultaneously recorded by a recording device.

The Overall Configuration of the Surgical Operation Supporting System

Figure 1:
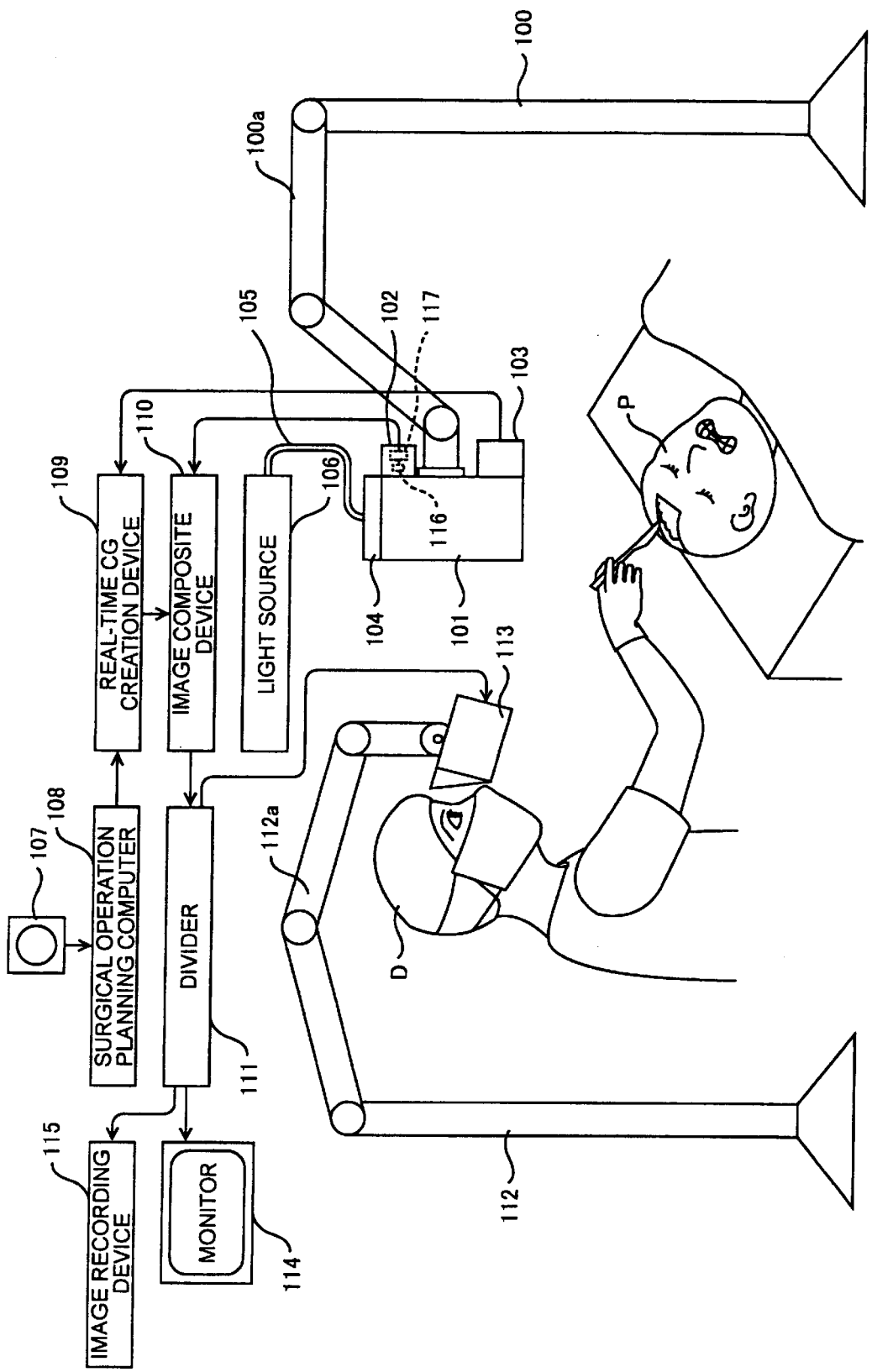
FIG. 1 is a schematic view showing an overall construction of a surgical operation support system equipped with a video-type stereoscopic microscope according to a preferred embodiment of the present invention.

FIG. 1 schematically shows an arrangement of the surgical operation supporting system. As shown in this figure, the surgical operation supporting system is composed of a stereoscopic microscope 101, a high definition CCD camera 102 attached on the upper end of the back surface of the stereoscopic microscope 101, a microscope position measurement device 103 attached on the lower end of the back surface of the stereoscopic microscope 101, a counter weight 104 attached on the top of the stereoscopic microscope 101, a light guide fiber bundle 105 inserted into the interior of the stereoscopic microscope 101 through a center hole made in the counter weight 104, a light source 106 emitting illumination light to be introduced into stereoscopic microscope 101 through the light guide fiber bundle 105, a surgical operation planning computer 108 having a disk device 107, a real-time CG creation device 109 connected to the microscope position measurement device 103 and to the surgical operation planning computer 108, an image composite device 110 connected to this real-time CG creation device 109 and the high definition CCD camera 102, a divider 111 connected to the image composite device 110, an image recording device 115, and a monitor 114 and a stereoscopic viewer 113 which are connected to the divider 111.

The disk device 107 stores image data, such as CT scan image data, MRI image data, SPECT image data, blood flow field image data, that have been obtained through various detecting process with respect to a diseased part of a patient P. The disc device 107 also stores three-dimensional graphic data of the diseased part and its surrounding tissues, which have been created based on the various kinds of image data in advance. The three-dimensional graphic data represents shape, size and position of the diseased part and its surrounding tissues in a three-dimensional local coordinate system that is defined with a predetermined reference point set on the outer skin or surface of internal tissues of the patient as origin, in accordance with vector format or map format.

The stereoscopic microscope 101 has a mount on its back surface and is detachably fixed to the distal end of a free arm 100a of a first stand 100 through the mount. Thus, the stereoscopic microscope 101 can be moved within the space where the free arm 100a of the first stand 100 can reach, and can also be inclined in an arbitrary direction. Hereinafter, the object side (that is, patient side) relative to the stereoscopic microscope 101 will be defined as "low", and the opposite side as "high", so that understanding thereof may be easy.

Since the optical configuration in this stereoscopic microscope 101 will be explained in detail later, only its schematics thereof will be explained here.

Figure 2:
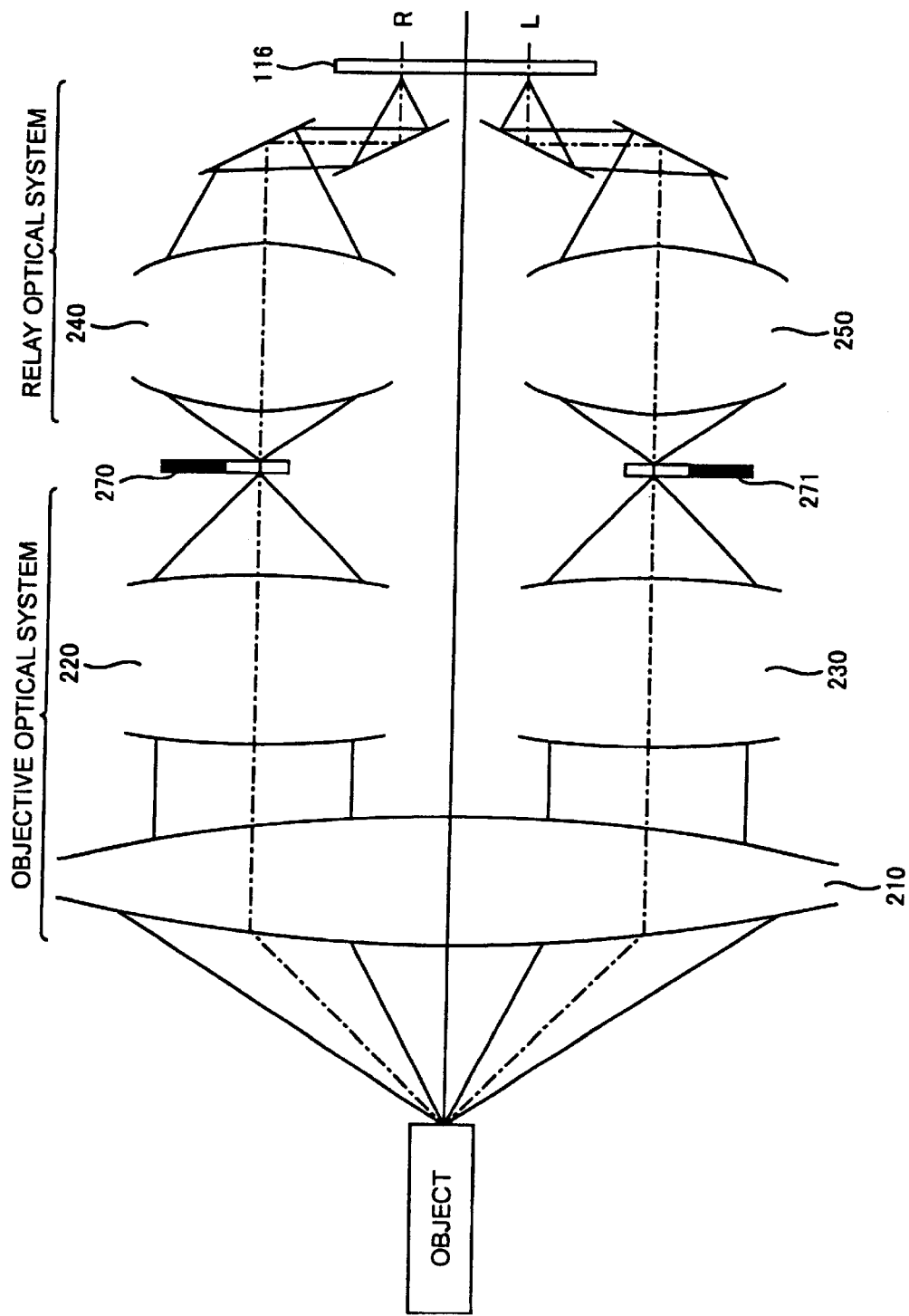
FIG. 2 is a schematic view showing an optical construction in the video-type stereoscopic microscope.

As shown in FIG. 2, primary images of an object are formed as aerial images at respective positions of right and left field stops 270, 271 through an objective optical systems including a large-diameter close-up optical system 210 having a single optical axis and a pair of right and left zoom optical systems 220, 230, which respectively focus light rays that have passed through different portions of the close-up optical system 210. A pair of right and left relay optical systems 240, 250 relay the right and left primary images to from right and left secondary images on the right and left image taking regions in an image taking surface of a CCD 116 mounted in the high definition CCD camera 102, respectively. Each of the image taking regions has a vertical to horizontal aspect ratio of 9:8, while the image taking surface of the CCD 116 has a "high definition" size of which aspect ratio of vertical to horizontal is 9:16.

The close-up optical system 210, the right zoom optical system 220, and the right relay optical system 240 together constitute a right image taking optical system. The close-up optical system 210, the left zoom optical system 230, and the left relay optical system 250 together constitute the left image taking optical system. The close-up optical system 210 is common to the right and left image taking optical systems. The right and left zoom optical systems 220, 230 and the right and left relay optical systems 240, 250 are arranged with a predetermined base length therebetween.

The images which are thus formed on the right and left image taking regions of the image taking surface of the CCD 116 through the pair of image taking optical systems are equivalent to stereovision images including a pair of images taken from two locations which are separated from each other by the predetermined base length, which are arranged side by side. An output signal from this CCD 116 is converted to a high definition video signal by the image processor 117, and is outputted from the high definition CCD camera 102 to the image composite device 110.

The stereoscopic microscope 101 contains an illuminating optical system 300 (see FIG. 6) for illuminating the object that is located in the vicinity of the focal point of the close-up optical system 210. Illuminating light from the light source 106 is introduced into this illuminating optical system 300 via the light guide fiber bundle 105.

Returning to FIG. 1, the microscope positioning measurement device 103 measures the distance to the object that exists on the optical axis of the close-up optical system 210, the three-dimensional orientation of the optical axis of the close-up optical system 210, and the position of the above-mentioned reference point. The microscope positioning measurement device 103 then calculates the position of the object in the above-mentioned local coordinate system based upon these measurements. The information about the orientation of the optical axis and the position of the object is sent to the real-time CG creation device 109.

This real-time CG creation device 109 creates real-time CG images, such as wire frame images, of a diseased part such as a tumor based on the information about the orientation of the optical axis and the position of the object which are sent from the microscope position measurement device 103, and based on the three-dimensional data down-loaded from the operation planing computer 108. These CG images are so created that they are equivalent to the stereoscopic images as viewed along the optical axis direction with the same base length and the same distance as those of the optical system of the stereoscopic microscope 101. The real-time CG creation device 109 outputs CG image signals representing the created CG images to the image composite device 110, one after another.

This image composite device 110 superimposes the CG image signals obtained by the real-time CG creation device 109 onto the high definition video signal of the actual object, which is inputted from the high definition CCD camera 102, with appropriately adjusting its scale. In the image represented by the high definition video signal superimposed with the CG image signal, the shape, size and the position of the diseased part are indicated as CG images (such as wire frame images) on the real image thereof. The thus superimposed high definition video signals are divided by the divider 111, and are supplied to the stereoscopic viewer 113 for a lead surgeon D, to the monitor 114 for other surgical staffs or an advisor at a remote location, and to the recording device 115, respectively.

The stereoscopic viewer 113 is attached to the distal end of a free arm 112a of a second stand 112 in the downward direction, so that the stereoscopic viewer 113 can be suitably positioned in accordance with a posture of the lead surgeon D that facilitates his/her operations. The schematic structure of this stereoscopic viewer 113 is shown in FIG. 3.

Figure 3:
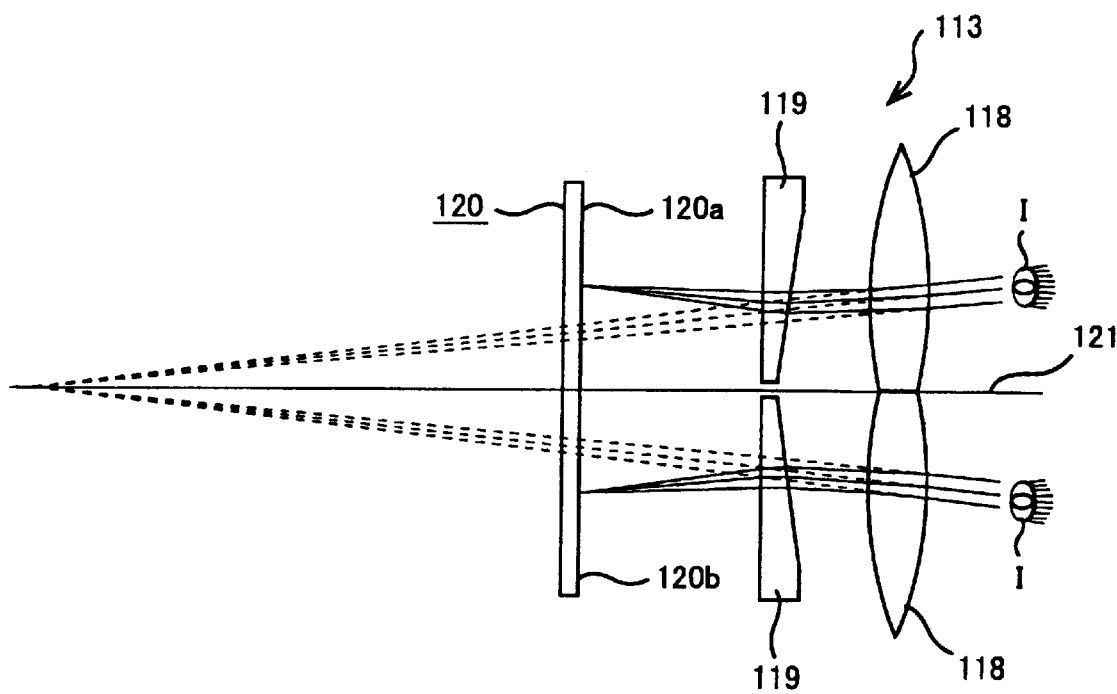
FIG. 3 is a schematic view showing an optical construction of a video-type stereoscopic viewer.
Figure 4:
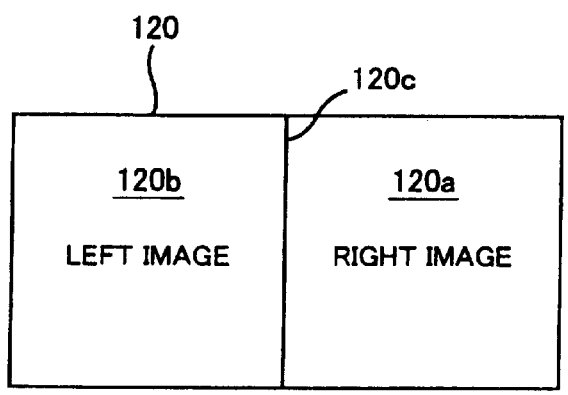
FIG. 4 is a plan view of an LCD panel.

As shown in the FIG. 3, the stereoscopic viewer 113 contains a high-definition-sized LCD panel 120 having an aspect ratio of 9:16 as a monitor. When the high definition video signal from the divider 111 is inputted into the LCD panel 120, as shown in the plan view of FIG. 4, the left half 120b of the LCD panel 120 displays the image taken by the left image taking region of CCD 116, and the right half 120a thereof displays the image taken by the right image taking region of CCD 116. A boundary 120c of these right and left images may be shifted or tilted depending upon adjustment of field stops 270, 271, which will be explained later.

The light paths in the stereoscopic viewer 113 are divided into the right and the left by a partition 121, which is installed along a direction perpendicular to the LCD panel 120 at the boundary 120c which emerges when the field stops 270, 271 are properly adjusted. At each side of the partition 121, a wedge prism 119 and an eyepiece 118 are disposed in that order from the side of LCD panel 120. The eyepiece 118 forms a magnified virtual image of the image displayed on the LCD panel 120 at a position that is located 1 m (−1 diopter) in front of observing eyes I. The wedge prism 119 adjusts the direction of the light such that the angle of convergence of the observing eyes I may correspond to that in case of observing an object placed 1 m in front of the eye I naked, thereby enabling natural three-dimensional observation.

As described above, the images obtained by the stereoscopic microscope 101 are superimposed with CG image such as a wire frame, which is created based upon images taken by various image-taking devices in advance, in order to show the shape, size, and the position of the diseased part. The superimposed images are viewed as three-dimensional images through the stereoscopic viewer 113 and displayed by the monitor 114. Accordingly, the lead surgeon D and other surgical staffs who are observing these images can easily identify the diseased part, which would be difficult to be identified with actual images only. Thus, the surgical operations can be conducted in a fast and accurate manner.

The Configuration of the Stereoscopic Microscope

Figure 5:
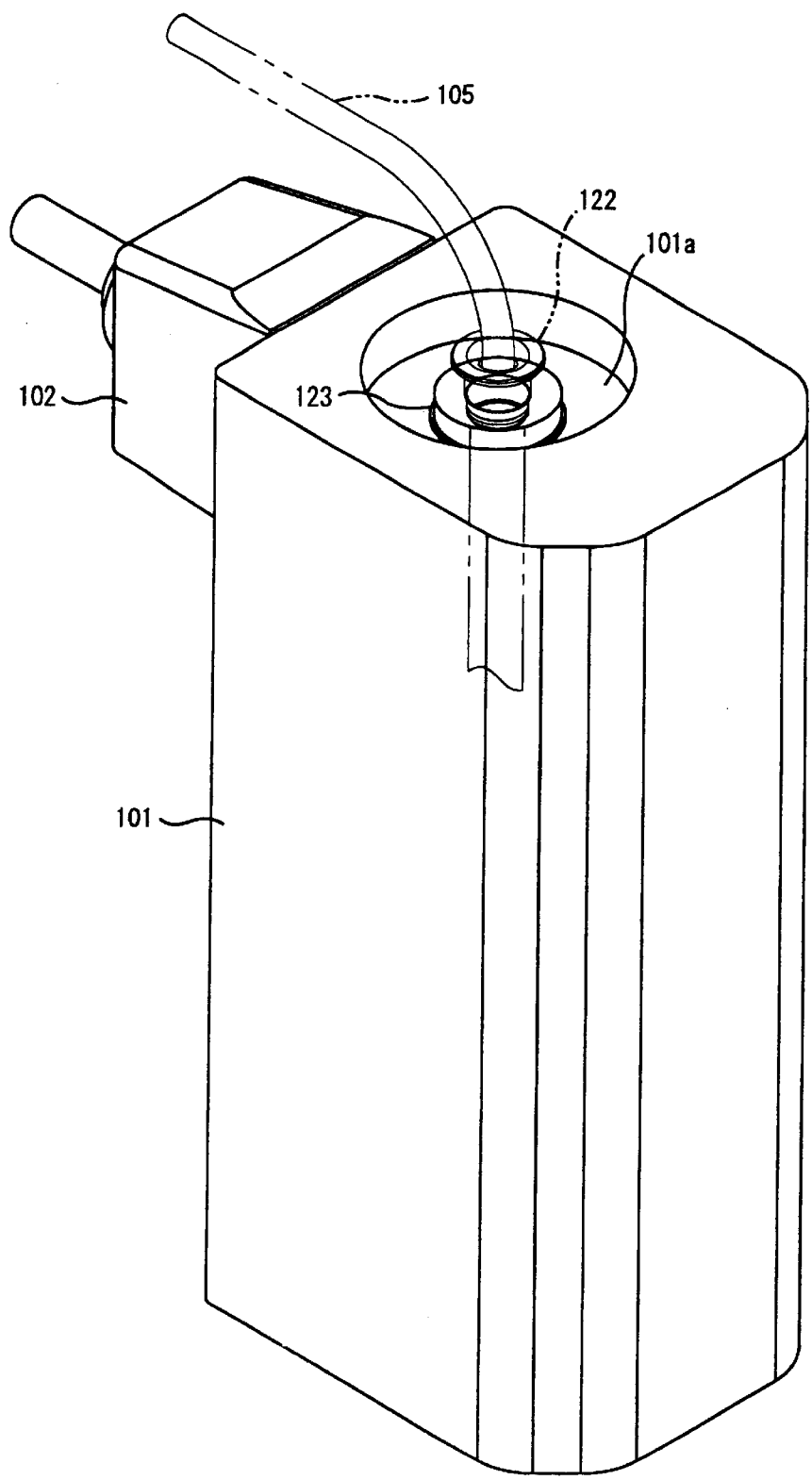
FIG. 5 is a perspective view showing an outer appearance of the stereoscopic microscope.

The structure of the above-mentioned stereoscopic microscope 101 (including the high definition CCD camera 102) is explained in more detail. As shown in FIG. 5, this stereoscopic microscope 101 has a shape of substantially polygonal column. The back surface of the stereoscopic microscope 101 is flat and is attached with the high definition CCD camera 102, and the front surface (that is, the opposite side of the back surface) has chamfered edges on both sides. At the center of the top surface, a circular recess 101a is formed. At the center of the recess 101a, an insertion opening (not illustrated) is bored so as to be inserted with a guide pipe 122, which is a cylindrical member fixedly covering the distal end of the light guide fiber bundle 105. Here, an annular-shaped member (that is, fiber guide insertion part) 123 attached to the insertion opening is a chuck for fixing the guide pipe 122 inserted into the insertion opening.

<Optical Configuration>

Figure 6:
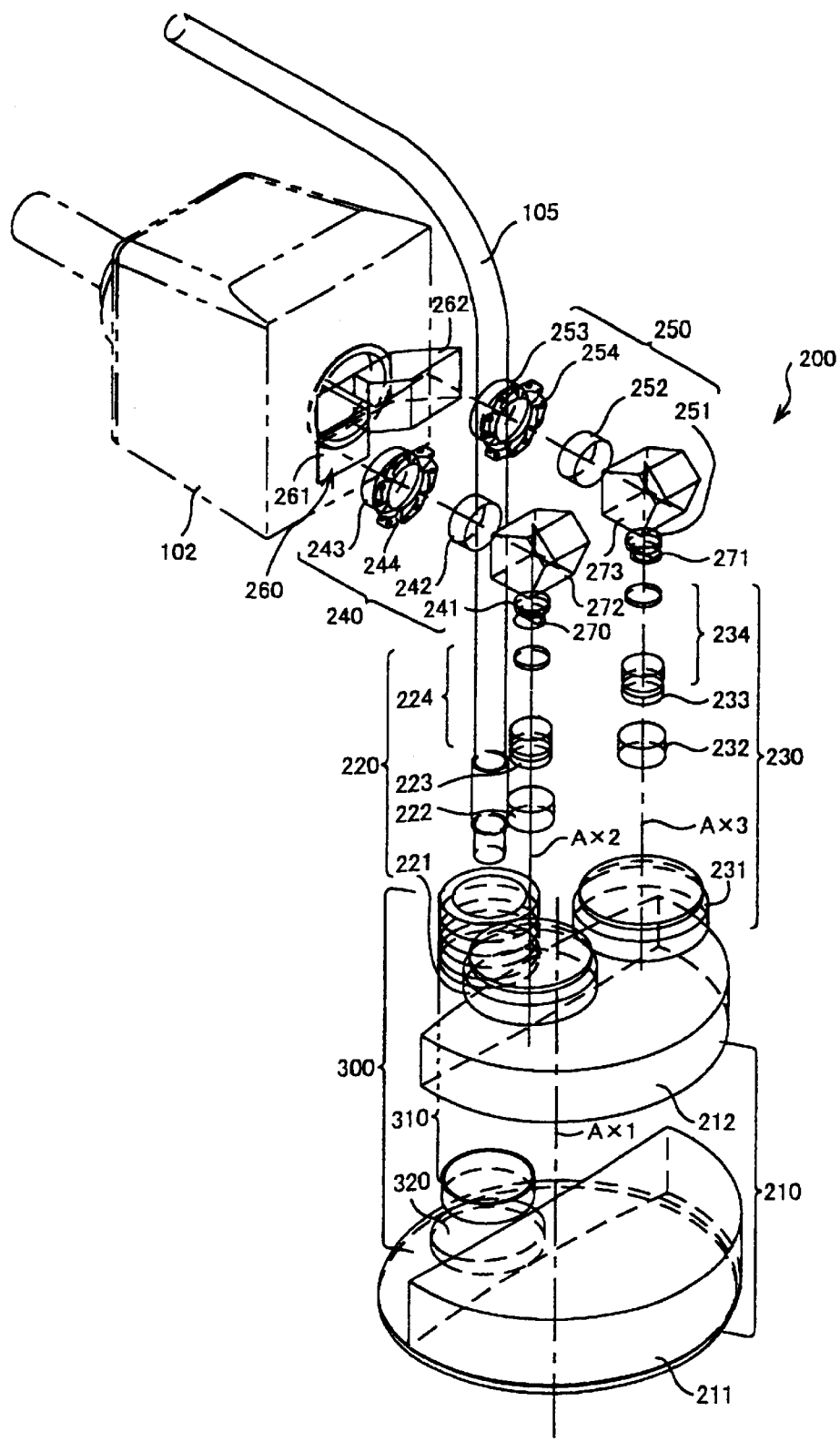
FIG. 6 is a perspective view showing an overall construction of a microscope optical system.
Figure 7:
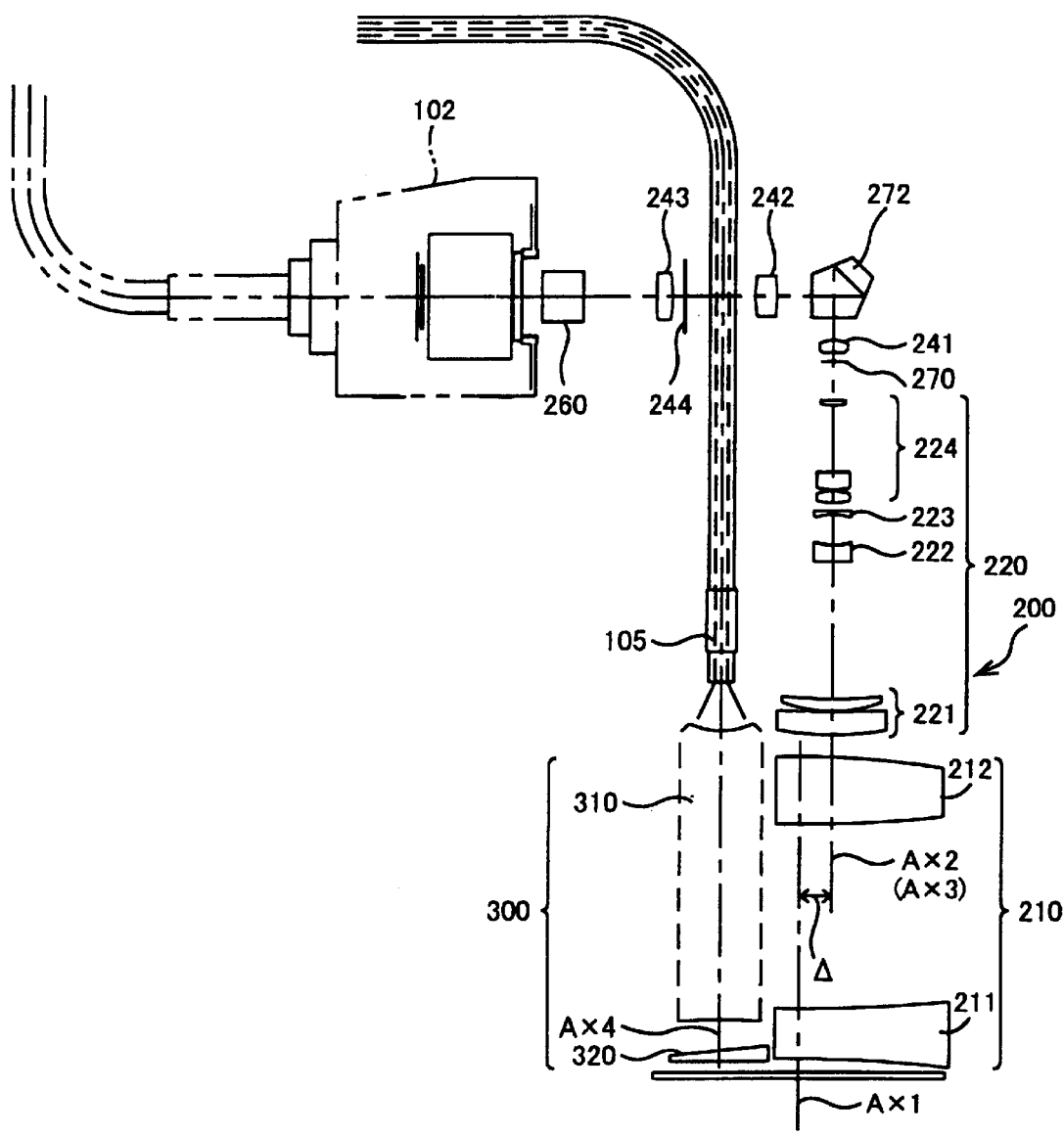
FIG. 7 is a side view showing an overall construction of the microscope optical system.
Figure 8:
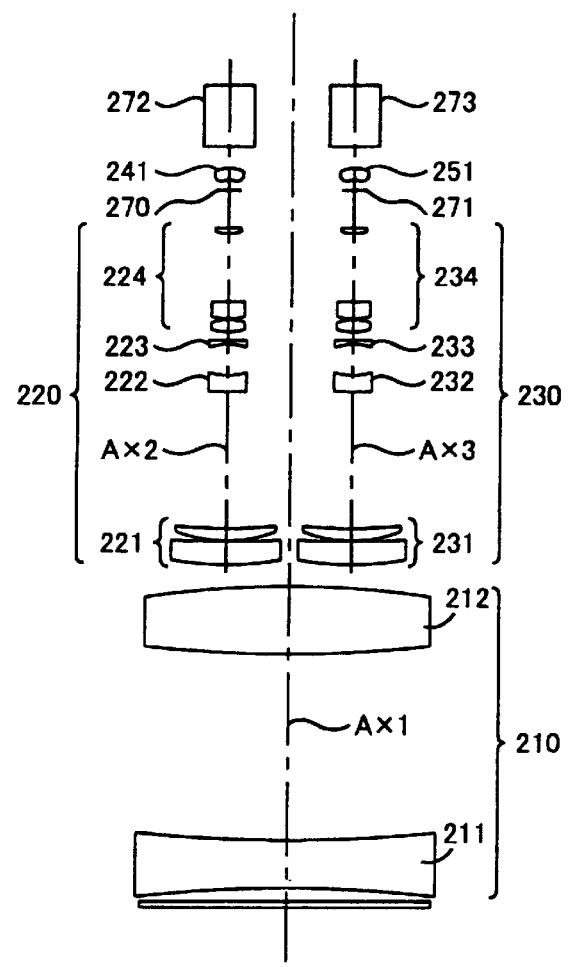
FIG. 8 is a front view showing an overall construction of the microscope optical system.
Figure 9:
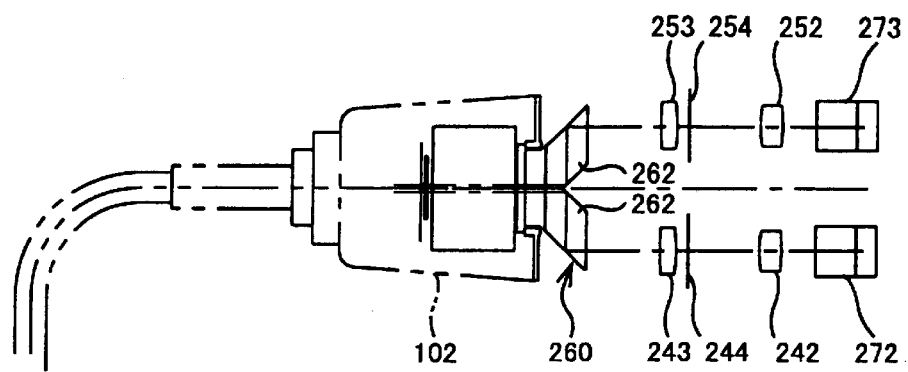
FIG. 9 is a plan view showing an overall construction of the microscope optical system.

Next, the optical configuration of the stereoscopic microscope 101 will be explained with reference to FIGS. 6 to 9. FIG. 6 is a perspective view of an overall structure of the microscopic optical system; FIG. 7 is a side view; FIG. 8 is a front view; and FIG. 9 is a plan view of the microscopic optical system.

As shown in FIG. 6, the microscopic optical system includes an image taking optical system (a pair of right and left image taking optical systems) 200 for electrically taking an image of an object, and an illuminating optical system 300 for illuminating the object with illuminating light guided from the light source 106 through the light guide fiber bundle 105.

The image taking optical system 200 includes an objective optical system, which includes a common close-up optical system 210 and a pair of right and left zoom optical systems 220, 230, for forming the primary images of the object; a pair of right and left relay optical systems 240, 250 for forming the secondary images by relaying the primary images; and an inter-axis distance reducing prism 260 as an inter-axis distance reducing element that brings the object light rays from the relay optical systems 240, 250 close to each other.

Also, at the positions where the primary images are formed by the zoom optical systems 220, 230, field stops 270, 271 are respectively disposed. In the relay optical systems 240, 250, pentagonal prisms 272, 273 are placed as optical path deflecting elements for deflecting the respective light paths at the right angle.

According to this construction, right and left images with a predetermined parallax can be formed on adjacent two regions of the CCD 116 installed in the CCD camera 102. Here, in the following explanations of optical systems, a "horizontal direction" is the direction that coincides with the longitudinal direction of the image taking surface of the CCD 116 when images are projected thereon, and a "vertical direction" is the direction that is perpendicular to the horizontal direction relative to the CCD 116.

Each of the optical systems will be explained hereinafter.

As shown in FIGS. 6, 7 and 8, the close-up optical system 210 includes a first lens 211 of a negative refractive power, and a second lens 212 of a positive refractive power arranged in that order from the object side. The second lens 212 moves along the optical axis direction for focusing in accordance with the object distance.

That is, since the second lens 212 is adjusted so that an object is placed at the object-side focal point of the close-up optical system 210, the close-up optical system 210 behaves like a collimator lens to convert divergent light from the object into substantially parallel light.

A portion of periphery of each of the first and second lenses 211, 212 constituting the close-up optical system 210 are cut out along a plane that is in parallel with its optical axis. Accordingly, when viewed from the direction of the optical axis, its planer shape is like as a character of D, which makes a space outside the section. In this space, an illuminating optical system 300 is placed such that its optical axis Ax4 is in parallel with the optical axis Ax1 of the close-up optical system 210, so that they function as image-forming optical systems.

A pair of zoom optical systems 220, 230 focus afocal object light from the close-up optical system 210 at the positions of the field stops 270, 271, respectively.

As shown in FIGS. 6 to 8, the right zoom optical system 220 includes first through fourth lens groups 221, 222, 223 and 224 of positive, negative, negative and positive refractive powers, respectively, in that order from the side of the close-up optical system 210. The first and fourth lens groups 221, 224 are fixed, and the second and third lens groups 222, 223 move for zooming along the optical axis direction. The second lens group 222 moves mainly to change the magnification, and the third lens group 223 moves to maintain the focal position.

Like the right zoom optical system 220, the left zoom optical system 230 includes the first through fourth lens groups 231, 232, 233, and 234. The right and left zoom optical systems 220, 230 are interlocked by a driving mechanism (not shown in the figures), whereby the magnifications of the right and left images can be changed simultaneously.

The optical axes Ax2, Ax3 of the zoom optical systems 220, 230 are disposed in parallel with the optical axis Ax1 of the close-up optical system 210 with an offset, such that the optical axes Ax2, Ax3 of the zoom optical systems 220, 230 have the same distance from the optical axis Ax1 of the close-up optical system 210 and have same distance from the section of the lenses 211, 212. When viewed from the direction of the optical axis Ax1 of the close-up optical system 210, the optical axis Ax1 of the close-up optical system 210 and the optical axes Ax2, Ax3 of the zoom optical systems 220, 230 form an isosceles and obtuse triangle with its apex at the position of the optical axis Ax1.

Moreover, the diameter of the close-up optical system 210, i.e., the inner diameter of the lens barrel 1, is set to be larger than the diameter of a virtual circle that includes the maximum effective diameters of the zoom optical systems 220, 230 and the maximum effective diameter of the illuminating optical system 300. Accordingly, the optical axes of the zoom optical systems 220, 230 are deflected by the close-up optical system 210, and intersect with each other at the focal position of the close-up optical system 210 at the object side. As a result, at the focal positions of the zoom optical systems 220, 230 at the image side, images which are equivalent to images that would be obtained by taking images of the same object from two locations separated by a predetermined base length are respectively formed.

The field stops 270, 271 are disposed on design positions at which the primary images are to be formed by the zoom optical systems 220, 230 having designed performance. As shown in FIG. 6, each of the field stops 270, 271 has a circular outline shape, and have a semi-circular aperture concentric with circular outline on the inner side in the horizontal direction. The field stops 270, 271 are disposed such that the straight edges of these apertures coincide with the vertical direction corresponding to the boarder line of the right and left images on the CCD 116, and such that only the inner parts of light flux can be transmitted.

The microscope according to the present embodiment needs to avoid overlapping of the right and left images on the CCD 116 in order to form the right and left secondary images on adjacent regions of the single CCD 116. Therefore, the field stops 270, 271 are placed at the position of the respective primary images. The straight-line edge of the semi-circular shaped aperture of each of those field stops 270, 271 functions as a knife-edge, so that only light rays traveling inside the edge can pass through the field stop 270, 271. The primary images formed on the field stops 270, 271 are re-imaged through the right and left relay optical systems 240, 250 as secondary images. The resultant secondary images are reversed in the horizontal direction and in the vertical direction with respect to the primary images. Thus, the knife edges defining the outside edges in the horizontal direction at the positions of the primary images define the inside edges in the horizontal directions at the positions of the secondary images, which clearly defines the boundary of the right and left images.

The relay optical systems 240, 250 includes three lens groups of positive refractive powers, respectively. As shown in FIGS. 6 and 7, the right relay optical system 240 includes a first lens group 241 composed of a single positive meniscus lens, a second lens group 242 having a positive refractive power as a whole, and a third lens group 243 composed of a single biconvex lens. The object side focal point of the combination of the first and second lens groups 241 and 242 is coincident with the image forming plane of the primary image formed by the zoom optical system 220. That is the same position as the field stop 271. The third lens group 243 converges parallel light transmitted from the second lens group 242 onto the image taking surface of the CCD 116. Between the first lens group 241 and the second lens group 242, the pentagonal prism 272 is disposed for deflecting the light path at the right angle. Between the second lens group 242 and the third lens group 243, an aperture stop 244 is installed for adjusting the light amount.

Like the right relay optical system 240, the left relay optical system 250 includes the first, second and third lens groups 251, 252 and 253. The pentagonal prism 273 is disposed between the first lens group 251 and the second lens group 252, and an aperture stop 254 is installed between the second lens group 252 and the third lens group 253.

The divergent light that has passed through the field stops 270, 271 is converted to substantially parallel light through the first lens groups 241, 251 and the second lens groups 242, 252 of the relay optical systems. After passing through the aperture stops 244, 254, the light rays are re-converged through the third lens groups 243, 253 to form the secondary images.

Since the pentagonal prisms 272, 273 are disposed inside the relay optical systems 240, 250, the total length of the image taking optical system 200 along the optical axis Ax1 of the close-up optical system 210 can be shortened. Further, if a mirror is used as the optical path deflecting element, a setting angle error of the mirror largely deviates the direction of the reflected light. On the other hand, the pentagonal prism keeps the direction of the reflected light when it rotates around an axis that is perpendicular to a plane including the optical axis of the zoom optical system before and after the deflection by the pentagonal prism.

Further, the second lens groups 243, 252 and the third lens groups 243, 253 in the relay optical systems 240, 250 are adjustable in the direction of the optical axis and in the direction perpendicular to the optical axis. When the second and third lens groups 242, 252, 243, 253 move along the optical axis direction, the resultant focal lengths of the first and second lens groups vary, which changes the magnification (the image height of the secondary images) of the relay optical systems 240, 250. Furthermore, adjustments of the third lens groups 243, 253 along the optical axis direction change the back focus of the relay optical systems, which enables the focus adjustment with respect to the CCD 116. In addition, when the second lens groups 242, 252 and the third lens groups 253, 253 are adjusted as a unit in a direction perpendicular to the optical axis, the positions of the secondary images are adjusted in a plane perpendicular to the optical axis.

For such adjustments, the second lens group 242 and the third lens group 243 in the right relay optical system 240 are held in a unitary outer lens barrel, and the third lens group 243 is further held in an inner lens barrel, which is movable relative to the outer lens barrel in the direction of the optical axis. In the same manner, the second lens group 252 and the third lens group 253 in the left relay optical system 250 are held in an outer lens barrel and the third lens group 253 is further held in an inner lens barrel.

Since the second lens groups 242, 252 and the third lens groups 243, 253 are movable in this matter for enabling various adjustments, if the pentagonal prisms 272, 273 were placed between these lens groups, the adjustment mechanism would become more complex. Therefore, it is preferable to place the pentagonal prisms 272, 273 between the field stops 270, 271 and the second lens groups 242, 252. Moreover, since the degree of divergence of the object light is reduced by the first lens groups 241, 251, the pentagonal prisms 272, 273 are preferably placed between the first lens groups 241, 251 and the second lens groups 242, 252 in order to make the effective diameter of the pentagonal prisms smaller.

The inter-axis distance reducing prism 260 is disposed between the relay optical systems 240, 250 and the CCD camera 102 to reduce the distance between the right and left object light rays from the respective relay optical systems 240, 250. To attain real stereoscopic feeling by the stereoscopic observation, it is necessary to have a predetermined base length between the right and left zoom optical systems 220, 230 and between the right and left relay optical systems 240, 250. On the other hand, to form secondary images on the adjacent regions on the CCD 116, it is necessary to shorten the distance between the optical axes than the base length. The inter-axis distance reducing prism 260 brings the optical axes of the relay optical systems close to each other, which enables to form secondary images on the same CCD 116 while keeping the predetermined base length.

As shown in FIGS. 6 and 9, the inter-axis distance reducing prism 260 includes a pair of optical axis shifting prisms 261, 262 having shapes of the pentagonal columns, which are symmetric to each other. The prisms 261, 262 are arranged in a right and left symmetric configuration with a spacing of about 0.1 mm therebetween.

As shown in FIG. 9, each of the optical axis shifting prisms 261, 262 has incident and exit surfaces that are parallel to each other, and has first and second reflecting surfaces in the respective outer side and inner side, which are also parallel to each other. Viewed in the direction parallel to the incident and exit surfaces and reflecting surfaces, these optical axis shifting prisms 261, 262 have a pentagonal shape formed by cutting out an acute-angle corner of a parallelogram with a line perpendicular to the exit surface.

The object lights from the relay optical systems 240, 250 are incident on the incident surfaces of the respective optical axis shifting prisms 261, 262; internally reflected by the outer reflecting surfaces so as to be directed in the horizontal direction; internally reflected by the inner reflecting surfaces so as to be directed to the optical axis directions that are the same as the incident direction; and are exited from the exit surfaces so as to be incident on the CCD camera 102. As a result, the distance between the right and left object light rays is narrowed without altering the traveling directions, and the secondary images are formed on the single CCD 116.

The illuminating optical system 300 has the function of projecting illumination light onto the object, and, as shown in FIG. 6 and FIG. 7, includes an illuminating lens 310 for adjusting the degree of divergence of divergent light emitted from the light guide fiber bundle 105 and a wedge prism 320 for deflecting the illumination light to coincide the illuminating region with the image taking region. As shown in FIG. 7, the optical axis Ax4 of the illuminating lens 310 is parallel to the optical axis Ax1 of the close-up optical system 210, and is offset from the optical axis Ax1 by a predetermined amount. Therefore, if the wedge prism 320 is not disposed, the center of the illuminating region would not coincide with the center of the image taking region, which wastes some amount of illuminating light. The wedge prism 310 matches the illuminating region with the image taking region, which enables effective use of the illuminating light.

<Optical System Holding Mechanism>

Figure 10:
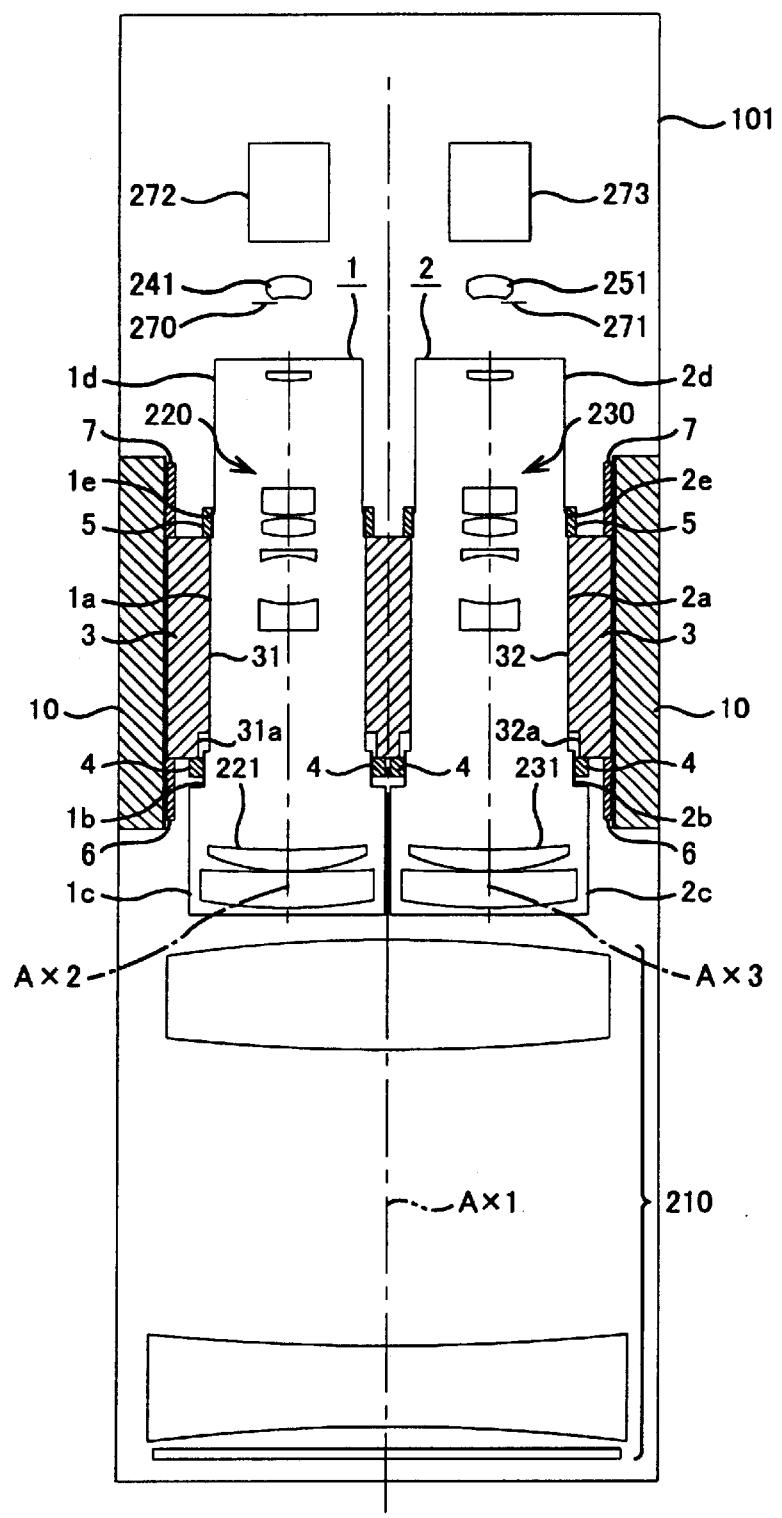
FIG. 10 is a schematic vertical cross-sectional view of the video-type stereoscopic microscope.

Next, the mechanical structure for holding a pair of zoom optical systems 220, 230 will be explained. FIG. 10 is a schematic cross-sectional view of the stereoscopic microscope 101, which is taken along a plane including both optical axes Ax2, Ax3 of the zoom optical systems 220, 230. As shown in FIG. 10, the right zoom optical systems 220 is held in the known zoom lens barrel 1, which is equipped with a cam mechanism for moving the lens groups 221 through 224 in a manner described above. Similarly, the left optical system 230 is held in the zoom lens barrel 2 that has the same structure as the zoom lens barrel 1. However, in FIG. 10, only the outline of a fixed ring which is the outermost shell of each zoom lens barrel 1, 2 is shown.

As shown in FIG. 10, the outer diameter of each zoom lens barrel 1, 2 decreases step by step from the incident side toward the emitting side. Specifically, the middle of each zoom lens barrel 1, 2, having a length of approximately ⅓ of the entire zoom lens barrel, is formed as a middle part 1a, 2a having a uniform diameter. A region having a predetermined width adjacent to incident side of the middle part 1a, 2a is formed as a lower threaded part 1b, 2b having a slightly larger diameter than the middle part 1a, 2a. A region from the lower threaded part 1b, 2b to the incident end of the zoom lens barrel 1, 2 is formed as a maximum diameter part 1c, 2c for holding the first lens group 221, 231. A region from the middle part 1a, 2a to the emitting end of each zoom lens barrel 1, 2 is formed as a small diameter part 1d, 2d having a slightly smaller diameter than the middle part 1a, 2a. An external thread is formed on the outer peripheral surface of each of the lower threaded parts 1b, 2b, and a lower fastening ring 4 having an internal thread on its inner peripheral surface is engaged with the corresponding threaded part 1b, 2b. Further, an external thread which will be referred as an upper threaded part 1e, 2e is formed on border of the small diameter part 1d, 2d adjacent to the middle part 1a and 2a. The diameter defined by the valleys of the external thread of the upper threaded part 1e, 2e is the same as that of the small diameter part 1d, 2d, and the diameter defined by the ridges of the external thread of the upper threaded parts 1e, 2e is the same as that of the middle parts 1a, 2a.

Figure 11:
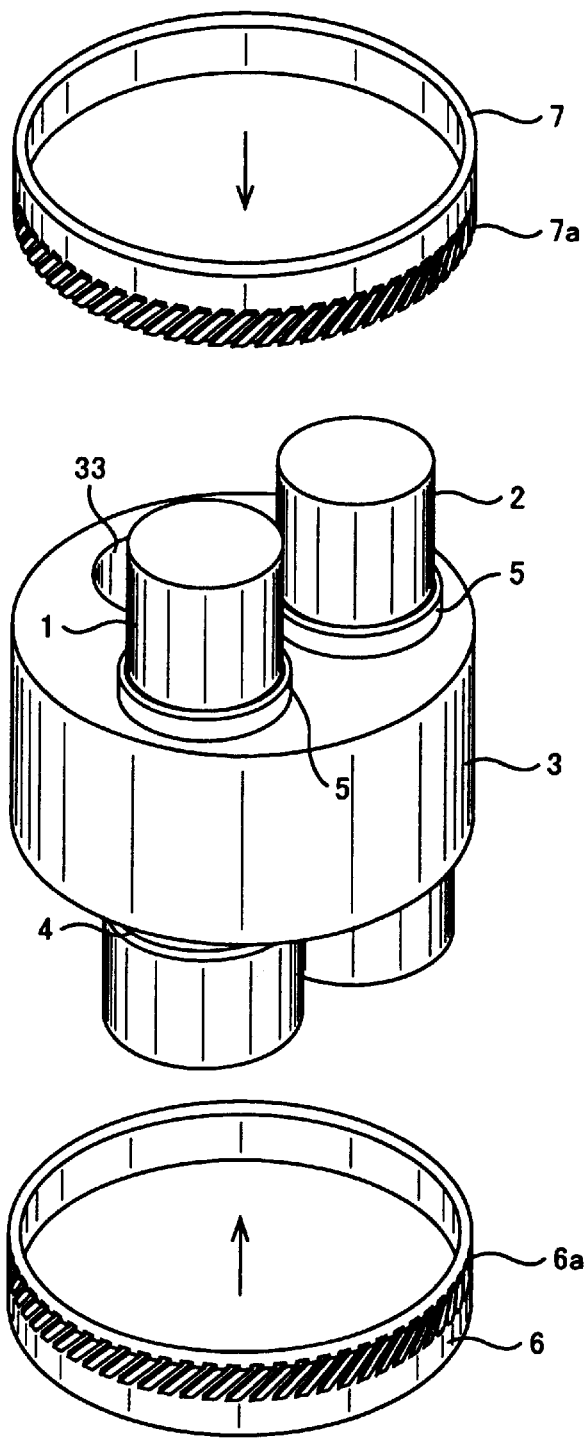
FIG. 11 is a perspective view of disassembled zoom housing and zoom housing adjusting rings.

As shown in FIG. 11, those zoom lens barrels 1, 2 are held in a zoom housing 3 in such a way as to penetrate the zoom housing 3, which has a columnar shape with a diameter that is substantially the same as that of the lenses 211, 212 constituting the close-up optical system 210. This zoom housing 3 is fixed in the casing of the stereoscopic microscope 101 such that the center axis of the zoom housing 3 coincides with the optical axis Ax1 of the close-up optical system 210. Holding bores which are through holes 31, 32 are bored between the both ends of the zoom housing 3. The centers of the holding bores 31, 32 are located at the positions of the optical axes Ax2, Ax3 of the zoom optical system 220, 230, respectively, which pass the respective designed positions under this configuration. Each holding bores 31, 32 has an inner diameter that is substantially the same as the outer diameter of the middle part 1a, 2a. A portion adjacent to the lower opening of each holding bore 31, 32 is formed as a spot facing 31a, 32a, which has an inner diameter that is slightly larger than the outer diameter of the lower threaded part 1b, 2b of each zoom lens barrel 1, 2 and that is smaller than the outer diameter of the lower fastening ring 4. Moreover, the zoom housing 3 has a through hole 33 for guiding light towards aside of the close-up optical system 210 through the above-mentioned light guide fiber bundle 105.

The above-mentioned zoom lens barrel 1 is inserted into the holding bore 31 of the zoom housing 3, and the zoom lens barrel 2 is inserted into the holding bore 32 from the side of the spot facings 31a, 32a, respectively. The end face of the lower fastening ring 4 which is engaged with each lower threaded part 1b, 2b comes into contact with the bottom face of the zoom housing 3 which is the end surface facing the close-up optical system 210, which causes the position of each zoom lens barrel 1, 2 to be restricted. Because the positioning is performed in this manner, the position of each zoom lens barrel 1, 2 is determined by the engagement position of the lower fastening ring 4 relative to the lower threaded part 1b, 2b. For example, if the lower fastening ring 4 is engaged with a portion adjacent to the lowest end of the lower threaded part 1b, 2b, the position of the zoom lens barrel 1, 2 is set such that a portion of the lower threaded part 1b, 2b enters in the spot facing 31a, 32a. Once the position of the zoom lens barrel 1, 2 is determined, at least a portion of the upper threaded part 1e, 2e of each zoom lens barrel 1, 2 protrudes from the upper end face of the zoom housing 3. The upper threaded part 1e, 2e of each zoom lens barrel 1, 2 which protrudes upwards in this manner is engaged with an upper fastening ring 5 that has an internal thread in its inner peripheral surface. The upper fastening ring 5 and the lower fastening ring 4 sandwiches the zoom housing 3, so that each zoom lens barrel 1, 2 is fixed to the zoom housing 3. As long as each zoom optical system 220, 230 is manufactured as designed, the positions of the primary images of the object formed through the respective zoom optical systems 220, 230 in the directions of the optical axes Ax2, Ax3 coincide with each other, if the engagement positions of the respective lower fastening rings 4 with respect to the lower threaded parts 1b, 2b of the respective zoom lens barrels 1, 2 are simply made to coincide with each other.

Figure 12:
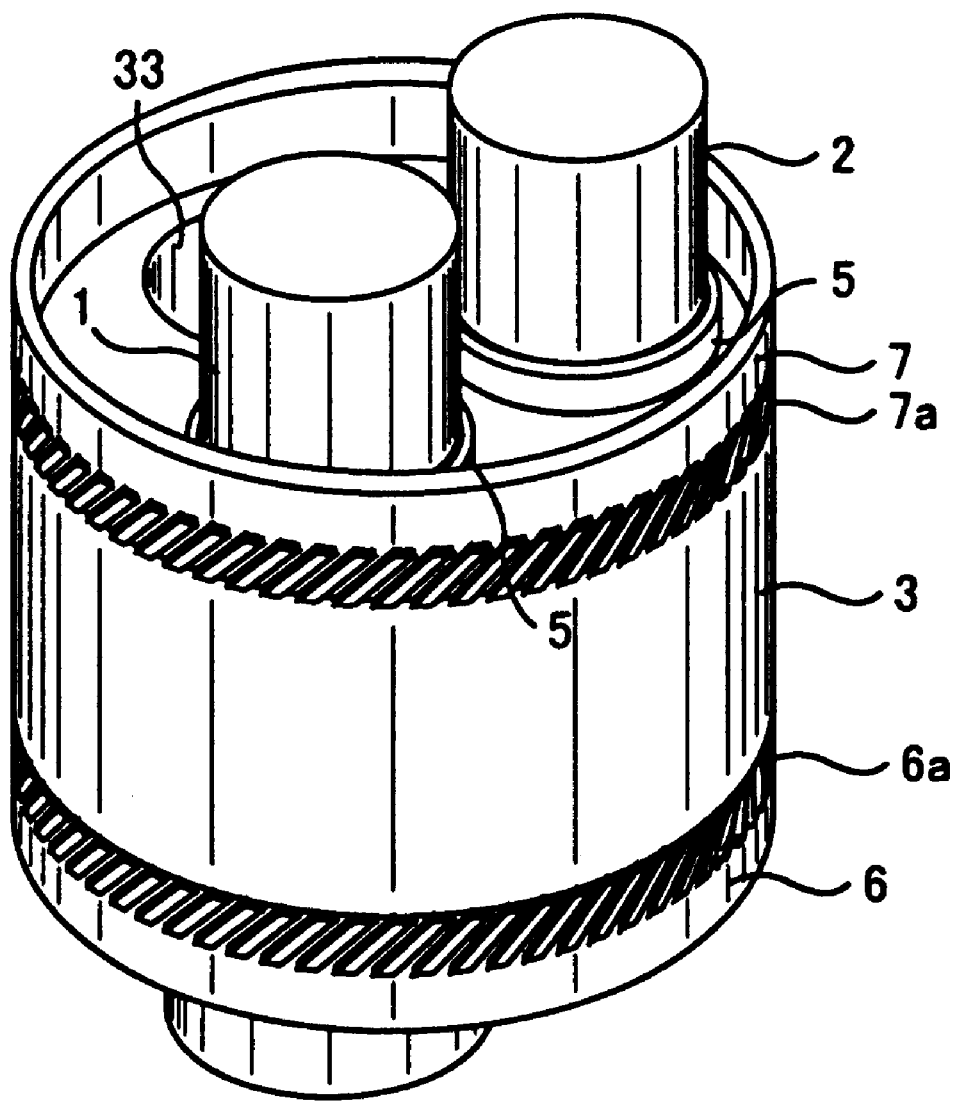
FIG. 12 is a perspective view showing the zoom housing adjusting ring and the zoom housing contacting with each other.

Next, the structure for fixing this zoom housing 3 in the casing of the stereoscopic microscope 101 will be explained. As shown in the FIG. 10, a part of the inner surface of the casing of the stereoscopic microscope 101 which is higher than the position of the close-up optical system 210 is formed as a cylindrical surface centered on the optical axis Ax1 of the close-up optical system 210 and having a diameter slightly larger than the zoom housing 3. The length of this cylindrical part 10 in the axial direction is larger than that of the zoom housing 3, and an internal thread is formed on the entire inner peripheral surface of the cylindrical part 10 with the optical axis Ax1 as its center. The zoom housing 3 is inserted into this cylindrical part 10. Zoom housing adjusting rings (upper adjusting ring 7, lower adjusting ring 6) are screwed into the cylindrical part 10 from the lower side and upper side thereof so as to sandwich the zoom housing 3. As shown in FIG. 11, each of those zoom housing adjusting rings 6, 7 has a ring-like shape, and an external thread 6a, 7a is protrusively formed on its outer peripheral surface adjacently to the edge that is to be in contact with the zoom housing 3. The respective external threads 6a, 7a of the zoom housing adjusting rings 6, 7 are engaged with the corresponding internal threads of the cylindrical part 10 so that the edges of the zoom housing adjusting rings 6, 7 may contact with the end faces of the zoom housing 3 and sandwich it therebetween as shown in FIG. 12, which causes the zoom housing 3 to be positioned and fixed in the cylindrical part 10.

Assembly and Adjustment of the Video-Type Stereoscopic Microscope

Next, the processes for assembly and adjustment of the stereoscopic microscope 101 having the above-mentioned construction will be explained. First, an operator assembles the close-up optical system 210, the illuminating optical system 300, and a pair of the relay optical systems 240, 250 that include the field stops 270, 271 and the prisms 272, 273 into respective lens barrels (not shown) that are prepared individually, and performs alignment of optical elements in each barrel, outside the casing of the stereoscopic microscope 101. The operator adjusts the field stops 270, 271 such that the respective apertures may be adjacent to each other and the respective edges are parallel to each other. In addition, the operator assembles the right zoom optical system 220 into a right zoom lens barrel 1, assembles the left zoom optical system 230 into a left zoom lens barrel 2 and performs alignment of their optical elements within each barrel.

Next, the operator inserts the zoom lens barrels 1, 2 into the respective holding bores 31, 32 of the zoom housing 3 and fixes them in the zoom housing 3 with the respective fastening rings 4, 5. At this time, the operator adjusts the engagement positions of the right and left lower fastening rings 4 with respect to the lower threaded parts 1b, 2b of the zoom lens barrels 1, 2 so as to be coincident with each other.

Figure 13:
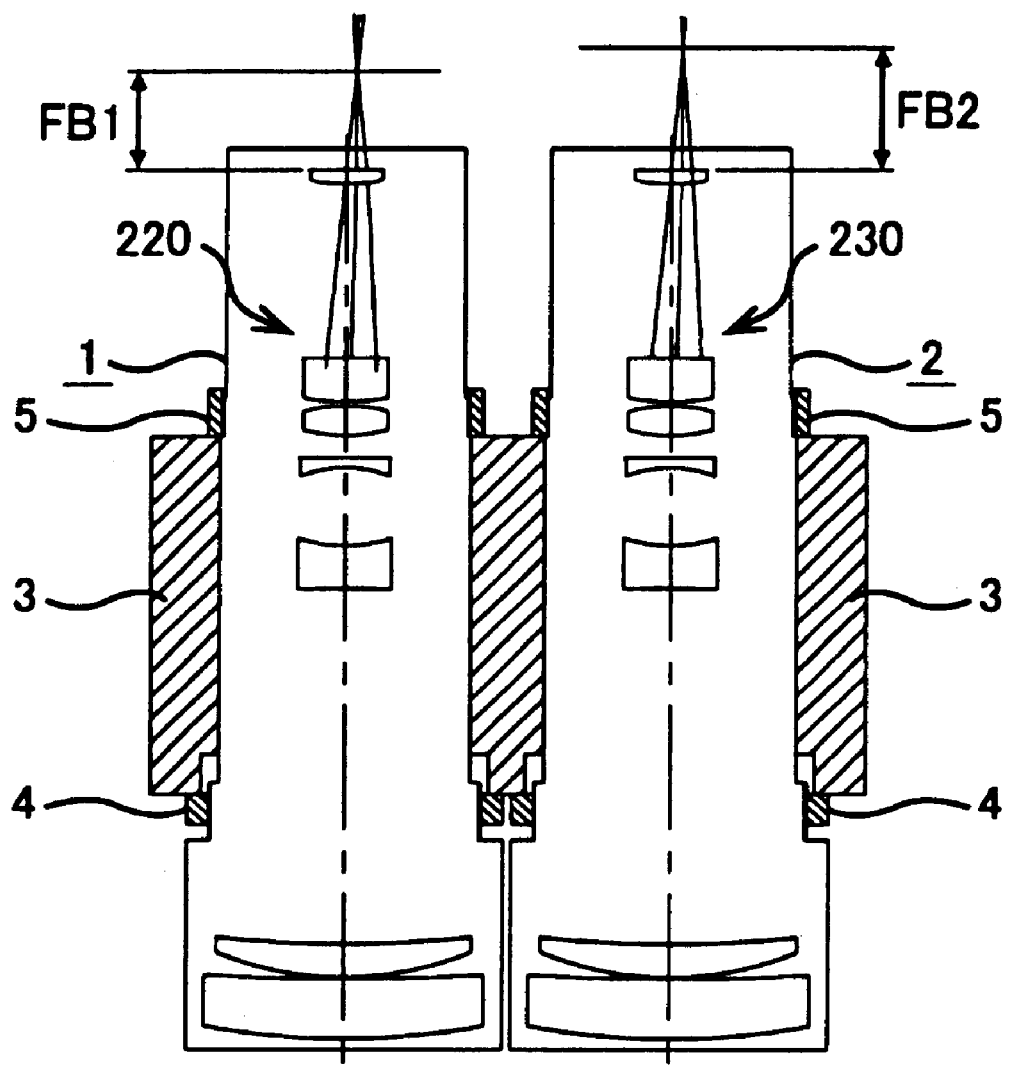
FIG. 13 is an explanatory figure showing a condition where the flange backs of the zoom optical systems do not coincide with each other.
Figure 14:
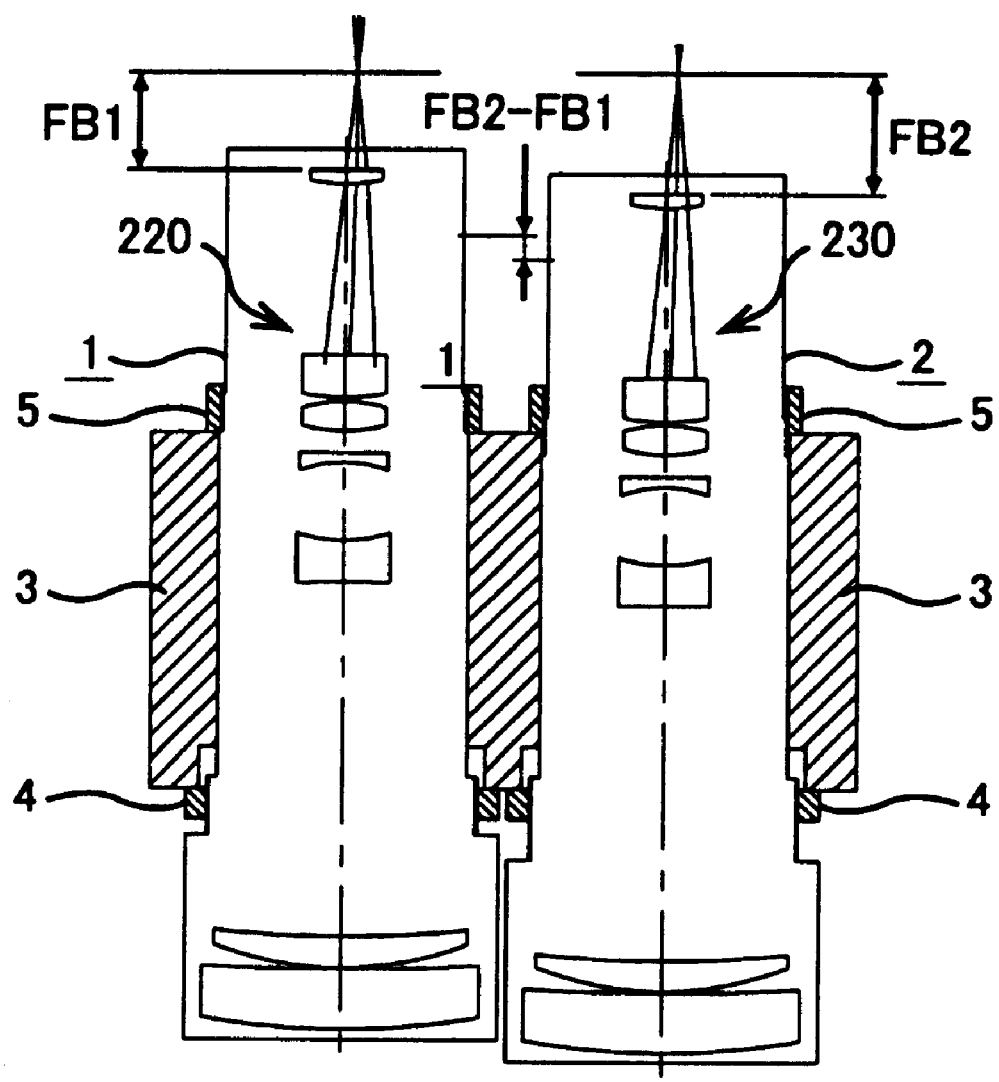
FIG. 14 is an explanatory figure showing an adjustment condition of each zoom lens barrel relative to the zoom housing.

Next, the operator measures distance of the flange back of each zoom optical system 220, 230 in each zoom lens barrel 1, 2 which is fixed to the zoom housing 3 with an MTF measurement apparatus. If each zoom optical system 220, 230 is manufactured as designed, the flange back of the zoom optical systems 220, 230 should be the same as each other. However, due to manufacturing errors and the like, there could be the case where these values are not the same as each other. FIG. 13 shows a case where the back focus FBI of the right zoom optical system 220 is shorter than the back focus FB2 of the left zoom optical system 230. In such a case, the operator loosens the left upper fastening ring 5 fixing the left zoom lens barrel 2, appropriately rotates the corresponding lower fastening ring 4 to adjust the engagement position of it relative to the lower threaded part 2b and thereafter re-fastens the upper fastening ring 5 so that the left zoom lens barrel 2 may move for a distance equal to the differential in the back focuses (FB2−FB1) between the zoom optical systems 220, 230. As a result, as shown in the FIG. 14, the image side focal positions of the zoom optical systems 220, 230 in the direction of the optical axis coincide with each other.

Figure 15:
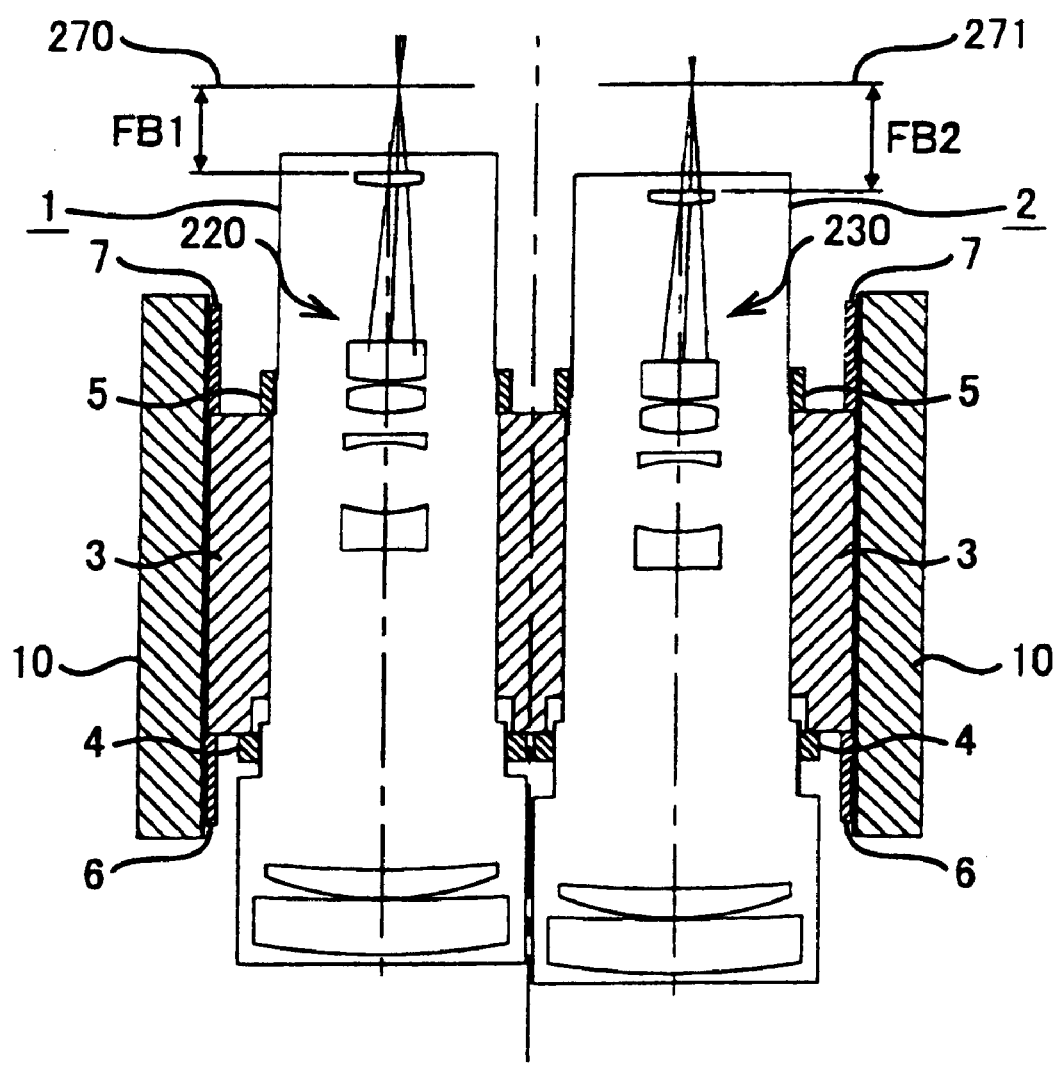
FIG. 15 is an explanatory figure showing an adjustment condition of the zoom housing relative to the field stops.

Next, as shown in FIG. 15, the operator inserts the zoom housing 3 in which the positions of the zoom lens barrels 1, 2 have been adjusted in the manner above into the cylindrical part 10 of the casing of the stereoscopic microscope 101, and temporarily fasten it with the zoom housing adjusting rings 6, 7.

Next, the operator fixes the relay optical systems 240, 250 which include the field stops 270, 271 and the prisms 272, 273, respectively and which have been assembled into respective lens barrels as described above, in the casing of the stereoscopic microscope 101, and attaches the high definition CCD camera 102 to the stereoscopic microscope 101. Then, the monitor 114 which receives the high definition signals from the high definition CCD camera 102 displays the right and left secondary images which are relayed through the respective relay optical systems 240, 250. The operator adjusts the focal conditions of the field stop 270, 271 with respect the CCD 116 by moving the third lens groups 243, 253 of the relay optical systems 240, 250 in the direction of their optical axes while monitoring the right and left secondary images displayed on this monitor 114. As a result, the images of the field stops 270, 271 are displayed on the monitor 114 with a high clarity.

Next the operator places autocollimators in front of the optical axes Ax2, Ax3 of the zoom optical systems 220, 230 and projects the images of targets of the autocollimators towards the respective zoom optical systems 220, 230, respectively. However, at this point, since the focal positions at the image side of the zoom optical systems 220, 230 do not always coincide with the respective positions of the field stops 270, 271, the target images displayed on the monitor 114 may not be properly focused. Then, the operator loosens and/or fastens the zoom housing adjusting rings 6, 7 which determine the position of the zoom housing 3 in an appropriate manner such that both the zoom optical systems 220, 230 in the zoom lens barrels 1, 2 held in the zoom housing 3 are moved in the direction of the optical axes Ax2, Ax3 together with the zoom housing 3. By such movement, the focal condition of each target image on the monitor 114 formed by the zoom optical systems 220, 230 changes. The operator repeats the above-mentioned movement and adjustment of the zoom housing 3 until the focal condition of the respective target images and the focal condition of the respective field stops 270, 271 coincide. Once the focal condition of the respective target images coincides with the focal condition of the respective field stops 270, 271, the operator tighten the zoom housing adjusting rings 6, 7 to fix the zoom housing 3 so that it may no longer move.

Finally, the operator assembles the lens barrel of the close-up optical system 210 into the casing of the stereoscopic microscope 101, thereby completing the stereoscopic microscope 101.

According to the video-type stereoscopic microscope of the present embodiment, as constructed above, the positions of the primary images formed through the zoom optical systems 220, 230 can be made to coincide with the positions of the field stops 270, 271 by appropriately moving the lens barrel housing 3 in the direction of the optical axis. Accordingly, when the focal conditions of the relay optical systems 240, 250 are properly adjusted, clear secondary images and clear images of the field stops 270, 271 can be formed together on the CCD 116.

Moreover, instead of changing the back focus by adjusting the spacing between constituent lenses of the zoom optical systems 220, 230, the zoom lens barrels 1, 2 themselves which hold the entire zoom optical systems 220, 230 respectively are moved in order to make the positions of the primary images coincide with each other. Thus, the problems such as variation in magnification and in position of the final images due to zooming do not occur. In addition, light from the object is parallel light between the zoom optical systems 220, 230 and the close-up optical system 210. Therefore, although the respective distance from the zoom optical system 220, 230 to the close-up optical system 210 is varied by moving the zoom optical systems 220, 230, this operation never causes the problem of degradation in image quality or affect the focus adjustment of the close-up optical system 210.

Moreover, the back focuses of the zoom optical systems 220, 230 are measured and the adjustment to match the positions of the primary images is conducted outside the casing of the stereoscopic microscope 101, thereafter the zoom housing 3 including the zoom lens barrels 1, 2 is assembled into the casing. As a result, only the positional adjustment of the zoom housing 3 in the direction of the optical axis remains to be performed in the casing. Accordingly, there is no need to adjust the zoom lens barrels 1, 2 individually within the casing. Thus, adjustment operations become significantly simpler.

As explained above, according to the stereoscopic microscope of the present invention, the positions of the real images of same object formed by a pair of right and left objective optical systems can be adjusted with a simpler mechanism.

The present disclosure relates to the subject matters contained in Japanese Patent Application No. HEI 11-150832 filed on May 31, 1999, which is expressly incorporated herein by reference in its entireties.

What is claimed is:

1. A stereoscopic microscope, comprising:

a close-up optical system that emits object light rays from a predetermined object as parallel rays;

a pair of image-forming optical systems that converges said object light rays which are passed through different parts of the close-up optical systems to form respective real images of said object;

a pair of image-forming lens barrels that holds said image-forming optical systems, respectively;

a lens barrel housing that holds each of said image-forming lens barrels such that positions of said image-forming lens barrels are adjustable, while keeping a condition that optical axes of said image-forming optical systems are in parallel with each other, in a direction of said optical axes; and a casing holding said close-up optical system, and also for holding said lens barrel housing such that a position of said lens barrel housing is adjustable, while keeping a condition that each of the optical axes of said image-forming optical systems is in parallel with an optical axis of said close-up optical system, in a direction of said optical axis.

2. The stereoscopic microscope according to claim 1, wherein each of said image-forming optical systems is a zoom optical system.

3. The stereoscopic microscope according to claim 1, further comprising:

a pair of relay optical systems relaying the respective real images formed by said image-forming optical systems;

an image pickup device picking up the images relayed by the relay optical systems; and a pair of field stops fixed at a designed position of the respective images formed by said image-forming optical systems, each of said field stops having an edge for shielding space corresponding to an overlapped portion of the images relayed by said relay optical systems.

4. The stereoscopic microscope according to claim 1, wherein said lens barrel housing has a pair of through bores into which said image-forming lens-barrels are respectively inserted, and wherein each of said image-forming lens barrels is formed on its outer peripheral surface with an external thread which engages with a pair of rings sandwiching said lens barrel housing therebetween, so that a position of each of said image-forming optical systems is adjustable relative to said lens barrel housing.

5. The stereoscopic microscope according to claim 1, wherein an outer peripheral surface of said lens barrel housing is a cylindrical surface; and wherein said casing has a through hole into which said lens barrel housing is inserted.

6. The stereoscopic microscope according to claim 5, wherein an internal thread is formed on inner peripheral surface of the through hole of said casing, and wherein said lens barrel housing is held in the through hole in a condition where a pair of rings, which is engaged with the internal thread:formed in the through hole of said casing, and which sandwiches said lens barrel housing.

* * * * *